United States Patent [19]
Hattori et al.

[11] Patent Number: 5,903,316
[45] Date of Patent: *May 11, 1999

[54] INFORMATION SIGNAL PROCESSING APPARATUS

[75] Inventors: Yuichiro Hattori; Shinichi Yamashita; Akira Nakaya, all of Yokohama; Ichirou Kuwana, Musashino, all of Japan

[73] Assignee: Canon Kabushiki Kaisha

[*] Notice: This patent issued on a continued prosecution application filed under 37 CFR 1.53(d), and is subject to the twenty year patent term provisions of 35 U.S.C. 154(a)(2).

[21] Appl. No.: 08/703,580

[22] Filed: Aug. 27, 1996

Related U.S. Application Data

[63] Continuation of application No. 08/172,422, Dec. 22, 1993, abandoned.

[30] Foreign Application Priority Data

Dec. 25, 1992 [JP] Japan ................................ 4-358963
Dec. 28, 1992 [JP] Japan ................................ 4-360148

[51] Int. Cl.$^6$ ............................ H04N 5/21; H04N 5/202; H04N 9/64
[52] U.S. Cl. ..................... 348/571; 348/625; 348/674; 348/718; 348/254
[58] Field of Search ................................ 348/625, 627, 348/628, 629, 630, 631, 674, 675, 676, 677, 678, 679, 571, 254–256; 345/136, 147, 148, 149; 395/821–827, 832, 840, 841, 856, 858, 860

[56] References Cited

U.S. PATENT DOCUMENTS

| | | | |
|---|---|---|---|
| 3,919,470 | 11/1975 | Blom et al. | 348/625 |
| 4,200,888 | 4/1980 | Blom . | |
| 4,821,100 | 4/1989 | Yamamoto . | |
| 4,926,261 | 5/1990 | Matsumoto et al. | 358/167 |
| 4,994,915 | 2/1991 | Takahashi et al. | 348/625 |
| 5,303,047 | 4/1994 | Yoshida | 348/607 |

FOREIGN PATENT DOCUMENTS 0290469  11/1988  Japan ............................ H04N 5/208

Primary Examiner—John K. Peng
Assistant Examiner—Vivek Srivastava
Attorney, Agent, or Firm—Morgan & Finnegan LLP

[57] ABSTRACT

According to an information signal correction processing apparatus of the invention which includes a plurality of clip circuits, a knee circuit, an adder, and a controller, an information signal which has been obtained through the clip circuits by clipping an input information signal in accordance with a plurality of clipping characteristics which have been arbitrarily set and an information signal which has been obtained through the knee circuit by voltage dividing the input information signal in accordance with a voltage dividing ratio which has been arbitrarily set are added by the adder and, when the resultant signal is outputted, the plurality of clipping characteristics and the voltage dividing ratio are respectively controlled by the controller, so that the information signal can be processed without being deteriorated.

11 Claims, 19 Drawing Sheets

POSITIVE
NEGATIVE

POSITIVE
NEGATIVE

POSITIVE

NEGATIVE ( ORDER OF PRIORITY FOR INITIAL VALUE SETTING )

FIG. 20

| | SELECTION RESULT | ORDER OF PRIORITY HIGH ←→ LOW | TRANSMISSION REQUEST (REQ) |
|---|---|---|---|
| ① | TRANSMIT A | Ⓐ B C D E (INITIAL VALUE) | A B C D E |
| ② | TRANSMIT C | B Ⓒ D E A | C D E A |
| ③ | TRANSMIT E | B D Ⓔ A C | E A C |
| ④ | TRANSMIT E | B D A C Ⓔ | E |
| ⑤ | TRANSMIT B | Ⓑ D A C E | A B C D E |
| ⑥ | TRANSMIT A | D Ⓐ C E B | A B C E |
| ⑦ | TRANSMIT D | Ⓓ C E B A | A B C D E |
| | | C E B A D | |

INFORMATION SIGNAL PROCESSING APPARATUS

This is a continuation of application Ser. No. 08/172,422, filed on Dec. 22, 1993 now abandoned.

BACKGROUND OF THE INVENTION

1. Field of the Invention

The invention relates to an information signal processing apparatus for processing an information signal.

2. Related Background Art

Hitherto, a CRT is generally used as a display apparatus of a video signal. The CRT has light emitting characteristics as shown in FIG. 1 for an input voltage. The light emitting characteristics can be expressed by the following equation when it is assumed that V indicates an input voltage, L, shows a radiation luminance, and k denotes a proportional constant.

$$L = kV^{\gamma} \quad (\gamma = \text{about } 2.2) \tag{1}$$

In a television system, therefore, a process called a gamma correction is executed as an information signal process in order to correct the light emitting characteristics at the time of photographing. The gamma correction can be expressed by the following equation when it is assumed that a luminance level is set to E and the level after completion of the gamma correction is set to V.

$$V = E^{1/\gamma} \tag{2}$$

FIG. 2 shows the gamma correcting characteristics by the above equation (2).

FIG. 3 shows a gamma correction circuit which is used in a conventional video camera or the like to perform the gamma correction mentioned above. In the diagram, reference numeral 1 denotes an input terminal to which an input signal (negative polarity) is supplied; 2 a transistor for converting an impedance; 3 an emitter resistor to decide an emitter current of the transistor 2; $4_1$ to $4_n$ diodes; 5 and $6_1$ to $6_n$ dividing resistors each for deciding an amplitude voltage of an output signal; $E_1$ to $E_n$ power source voltages each for setting a polygonal point of input/output characteristics; and 7 an output terminal.

The operation of the gamma correction circuit shown in FIG. 3 will now be described. For example, when an input signal as shown in FIG. 4 is supplied to the input terminal 1, the input signal is output from the output terminal 7 through the impedance converting transistor 2 and the dividing resistor 5 connected to an emitter thereof. In this instance, when the potential of the output terminal 7 is further reduced than the potential which is lower than each of the polygonal point set voltages $E_1$ to $E_n$ of the input/output characteristics by only $V_D$ (voltage≅0.6 [V] that is applied to the diodes $4_1$ to $4_n$), the diodes $4_1$ to $4_n$ are made conductive. An output voltage of the emitter is divided by the dividing resistors: 5 and $6_1$ to $6_n$.

In this case, in the case where there is one combination of the diodes $4_1$ to $4_n$, resistors $6_1$ to $6_n$, and voltages $E_1$ to $E_n$, the input/output characteristics of the circuit are set to polygonal characteristics in which the number of polygonal points by the voltage division is equal to 1. When there are (n) such combinations, the polygonal characteristics having n polygonal points are obtained.

FIG. 5 shows the input/output characteristics when there are three polygonal points. Gamma correcting characteristics which are close to those shown in FIG. 2 and by equation (2) are obtained. In FIG. 5, an input signal and an output signal are shown by relative values.

Therefore, to raise a precision of the gamma correction, it is necessary to increase the number of polygonal points by increasing the number of diodes $4_1$ to $4_n$, the number of dividing resistors $6_1$ to $6_n$, and the number of polygonal point setting voltages $E_1$ to $E_n$.

In the television system, an outline correcting apparatus is used as an information signal processing apparatus in order to emphasize an outline of a display image. FIG. 6 shows a conventional outline correcting apparatus.

In FIG. 6, reference numeral 31 denotes an input terminal of a video signal; 32 a delay circuit to match the phases of the video signal and outline signal; 34 an outline signal extraction circuit to extract the outline signal from the video signal which was input from the input terminal 31; 36 a gain adjustment circuit to adjust an amount of outline which is applied to the video signal by adjusting a gain of the outline signal; 37 an adder to add the outline signal to the video signal; and 38 an output terminal of the outline corrected video signal.

The operation of the outline correcting apparatus shown in FIG. 6 will now be described.

When a video signal as shown in FIG. 7A is supplied to the input terminal 31, an outline signal as shown in FIG. 7B is extracted by the outline signal extraction circuit 34. The outline signal is adjusted to a proper level by the gain adjustment circuit 36 and, after that, it is added to the original video signal by the adder 37. For example, as shown in FIG. 7C, the addition output has a waveform whose outline is emphasized by an overshoot portion and an undershoot portion. Such a waveform signal is output from the output terminal 38.

Since the conventional gamma correction circuit is constructed as shown in FIG. 3, there are the following problems.

(1) An overall blank state of the picture plane cannot be automatically adjusted and cannot be remote controlled from the outside.

(2) The input/output characteristics of the gamma correction cannot be remote controlled from the outside.

(3) To perform the gamma correction at a high precision, a larger number of diodes $4_1$ to $4_n$ need to be used, so that a junction capacitance of the diodes becomes a load of the circuit and frequency characteristics are deteriorated by the AC and DC levels of the input signal.

On the other hand, since the conventional outline correcting apparatus is constructed as shown in FIG. 6, no problem occurs in case of executing the gamma correction after the outline was corrected. However, in case of performing the outline correction after completion of the gamma correction, there are the following problems.

The outline correction is obtained b)y adding the overshoot portion and undershoot portion each having the same amplitude to the edge portion of the image as shown in FIG. 7C. However, in case of outputting such a signal onto the CRT and displaying, the amplitudes of the undershoot portion and overshoot portion remarkably differ as shown in FIG. 8 due to the light emitting characteristics of the CRT as shown in FIG. 1. Particularly, the undershoot portion decreases. Thus, there is an impression such that the image is floating up and the image in which the natural feeling and stereoscopic feeling are insufficient is obtained.

As an information signal processing apparatus, in the case where data which was input to the input port is transferred to a memory and the data in the memory is selectively transmitted to a plurality of output ports, hitherto, such transmitting operations are controlled by using both of a method of transmitting the data to the input and output ports in accordance with the fixed order of priority and a method of transmitting the data from the input and output ports in accordance with the order of transmission requests.

According to the above conventional data transmitting method mentioned above, in the case where the transmission requests are frequently generated or are continuously generated, a problem such that each input and output ports are selected is not constant, so that a port in which an accumulation amount of data is large and a port in which a data accumulation amount is small occur. Therefore, in case of using such a method to an apparatus of a large information amount such as an image recording apparatus or the like, it is necessary to prepare an FIFO (First-in, First-out) memory or the like of a large capacity in the input and output ports.

SUMMARY OF THE INVENTION

It is an object of the invention to provide an information signal processing apparatus which can solve the above problems.

Another object of the invention is to provide an information signal processing apparatus which can process an information signal without deteriorating.

Under such objects, according to the present invention, as one embodiment, there is provided an information signal processing apparatus for processing an information signal, comprising: a plurality of clip circuits to each of which a common information signal is supplied and each of which clips the input information signal in accordance with clipping characteristics which are arbitrarily set and outputs the clipped signal; a knee circuit for voltage dividing the input information signal in accordance with a voltage dividing ratio which is arbitrarily set and outputting the divided signal; an addition circuit for adding the information signals which are output from the plurality of clip circuits and the information signal which is output from the knee circuit and for outputting the resultant addition signal; and control means for respectively controlling the clipping characteristics in the plurality of clip circuits and also controlling the voltage dividing ratio in the knee circuit.

Another object of the invention is to provide an information signal processing apparatus which can perform a proper process to an information signal.

Under such an object, according to the invention, as one embodiment, there is provided an information signal processing apparatus for processing an information signal, comprising: information signal extracting means for inputting an information signal, extracting a part of the input information signal, and outputting; level control means for controlling a gain of at least one of the positive polarity side and the negative polarity side of the partial information signal which is output from the information signal extracting means in accordance with a level of the information signal which is input to the information signal extracting means and for outputting; and adding means for adding the signal which is output from the control means to the information signal which is input to the information signal extracting means and for outputting.

Still another object of the invention is to provide an information signal processing apparatus which can stably process an information signal.

Under such an object, according to the invention, as one embodiment, there is provided an information signal processing apparatus of the invention for processing an information signal, comprising:

information signal processing means for processing an information signal; a plurality of input/output ports for instructing an information signal transmission request to transmit the information signal to the information signal processing means and to receive the information signal from the information signal processing means and for inputting or outputting the information signal in accordance with the instructed transmission request; a common bus for transmitting the information signal between the plurality of input/output ports and the information signal processing means; and information signal transmission control means for setting the order of priority when the information signal is transmitted in accordance with the information signal transmission requests which are instructed by the plurality of input/output ports to each of the plurality of input/output ports and for changing the order of priority each time the information signal is transmitted to the plurality of input/output ports, thereby controlling the transfer of the information signal.

The above and other objects and features of the present invention will become apparent from the following detailed description and the appended claims with reference to the accompanying drawings.

BRIEF DESCRIPTION OF THE DRAWINGS

FIG. 20 is a diagram for explaining the operation of the data transmission system shown in FIG. 17.

DETAILED DESCRIPTION OF THE PREFERRED EMBODIMENTS

The first embodiment of the invention will now be described hereinbelow.

Figure 1:
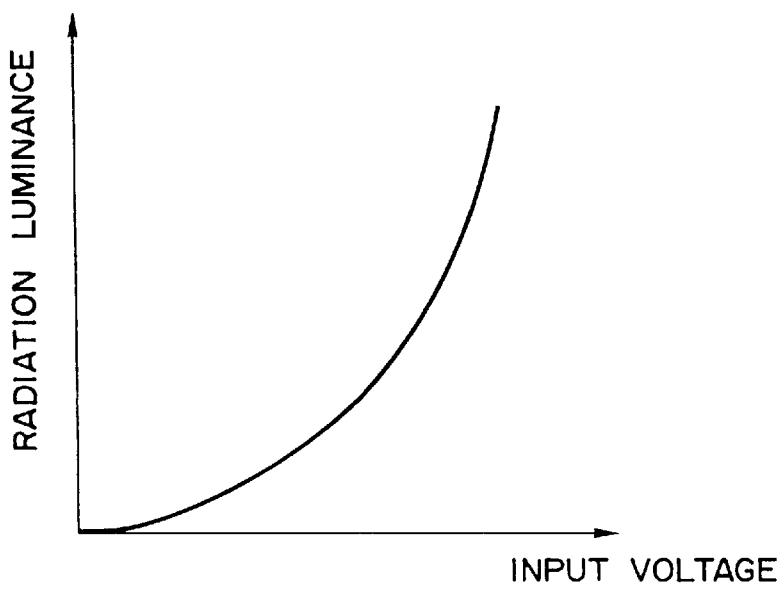
FIG. 1 is a diagram showing light emitting characteristics of a CRT.
Figure 2:
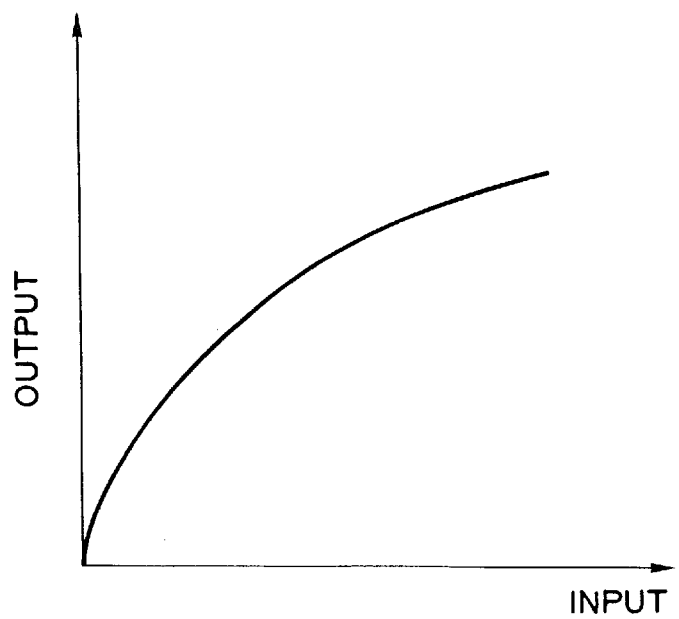
FIG. 2 is a diagram showing gamma correcting characteristics.
Figure 3:
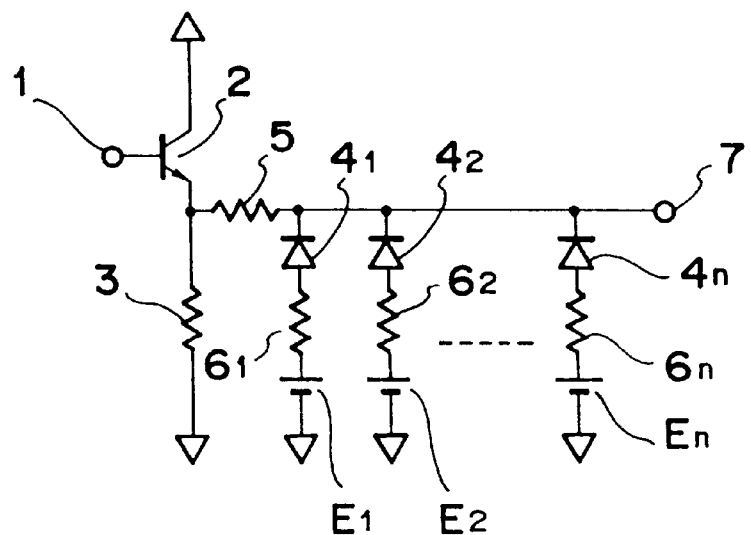
FIG. 3 is a diagram showing a construction of a conventional gamma correction circuit.

FIG. 1 is a diagram showing a construction of a gamma correction circuit as a first embodiment of the invention.

Figure 9:
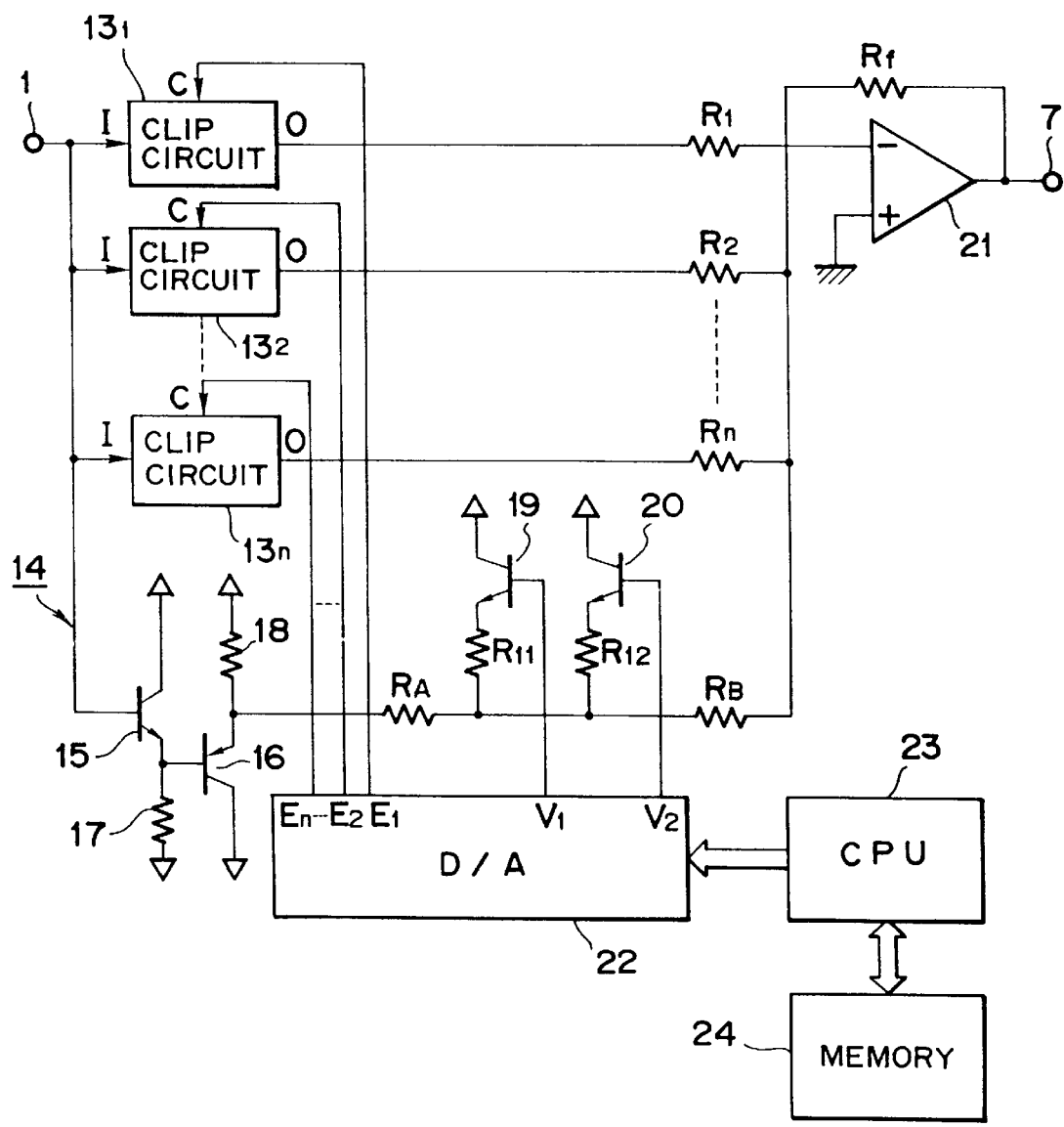
FIG. 9 is a diagram showing a constriction of a gamma correction circuit as a first embodiment of the invention.

In FIG. 9, reference numerals $13_1$ to $13_n$ denote clip circuits each of which can control a clipping level and to which an input signal is applied from the input terminal 1. Reference numeral 14 denotes a knee circuit which is constructed: emitter follower transistors 15 and 16 each for converting an impedance; their emitter resistors 17 and 18; resistors $R_A$, $R_{11}$, and $R_{12}$ each for switching a knee slope; and transistors 19 and 20 each for switching a knee slope.

Reference numeral 21 denotes an addition amplifier comprising an operational amplifier for adding an output of each of the clip circuits $13_1$ to $13_n$ and an output of the knee circuit 14; $R_1$ to $R_n$ and $R_B$ indicate addition resistors thereof; and $R_f$ a feedback resistor of the operational amplifier.

Reference numeral 22 denotes a D/A converter for outputting the voltages $E_1$ to $E_n$ as control signals to control the clipping levels of the clip circuits $13_1$ to $13_n$ and voltages $V_1$ and $V_2$ as control signals to control the transistors 19 and 20 for switching the connection of the resistors $R_{11}$ and $R_{12}$.

Reference numeral 23 denotes a CPU as control means for giving the digital data corresponding to the voltages $E_1$ to $E_n$, $V_1$, and $V_2$ to the D/A converter 22. Reference numeral 24 denotes a memory to store the digital data.

Figure 10:
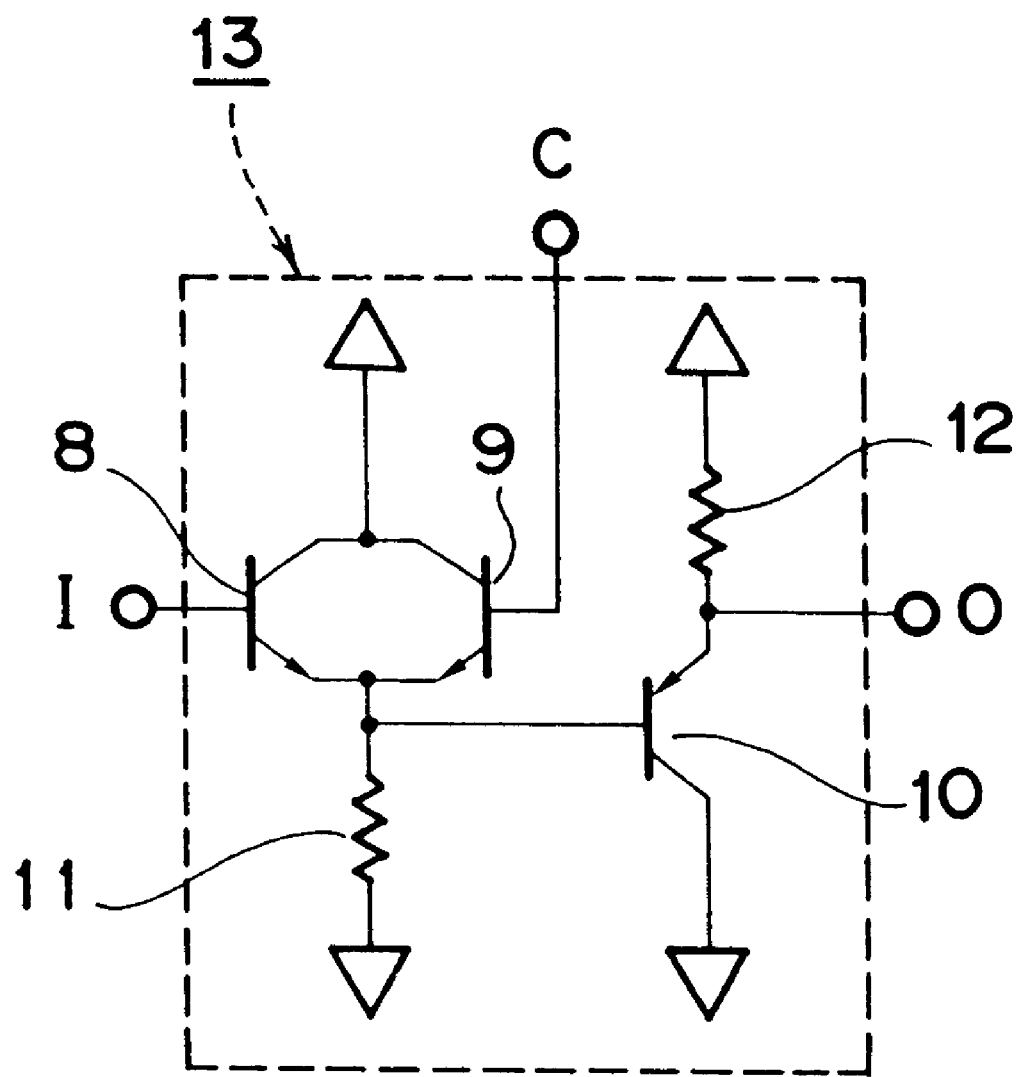
FIG. 10 is a diagram showing a construction of a clip circuit in FIG. 9.

FIG. 10 shows a construction of the clip circuits $13_1$ to $13_n$. Each clip circuit comprises: transistors 8 and 9 which construct a differential amplifier; a transistor 10 to which their emitter follower outputs are applied; and emitter resistors 11 and 12. An emitter follower output of the transistor 10 is divided by a resistance ratio and is applied to the addition amplifier 21 through a resistor $R_i$.

The operation of the gamma correction circuit of the construction shown in FIG. 9 will now be described.

Figure 4:
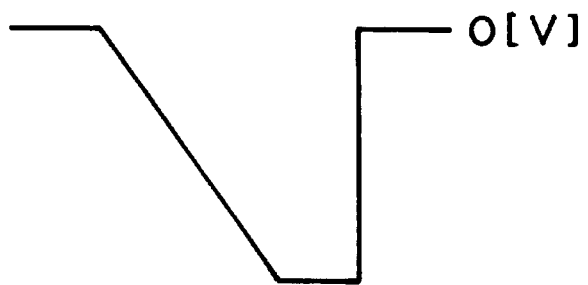
FIG. 4 is an input signal waveform diagram showing an example of a signal which is input to the gamma correction circuit shown in FIG. 3 in order to explain the operation of the conventional gamma correction circuit shown in FIG. 3.
Figure 5:
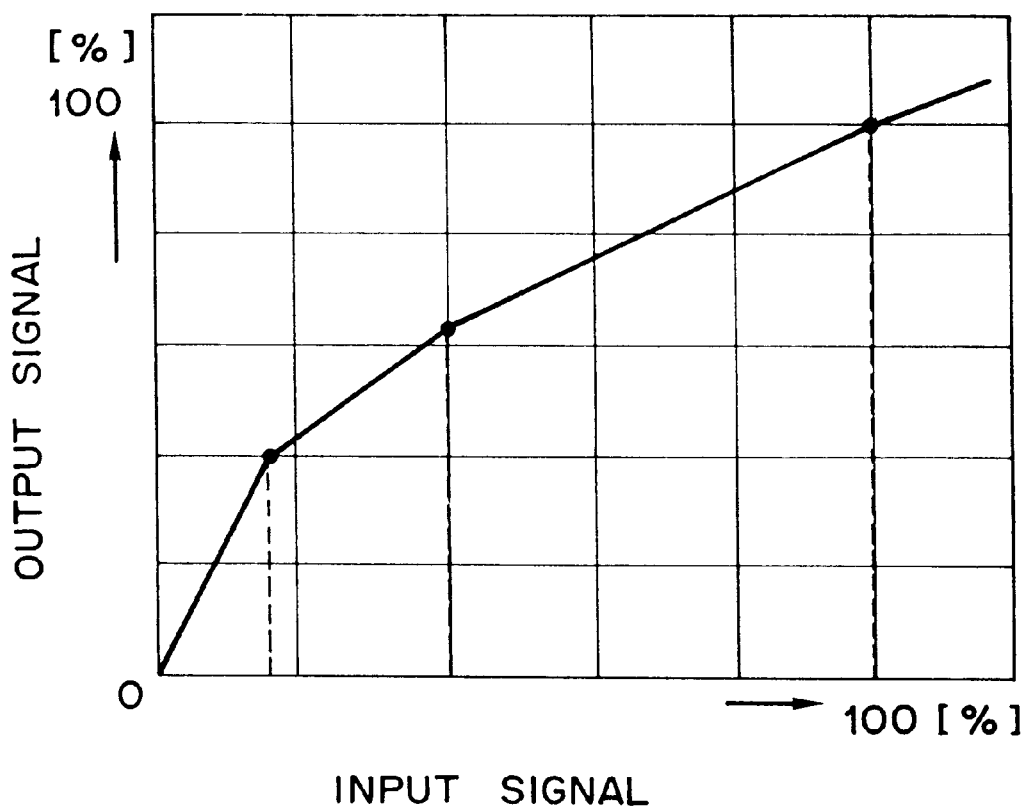
FIG. 5 is a diagram showing input/output characteristics of the signal in the conventional gamma correction circuit shown in FIG. 3.
Figure 11:
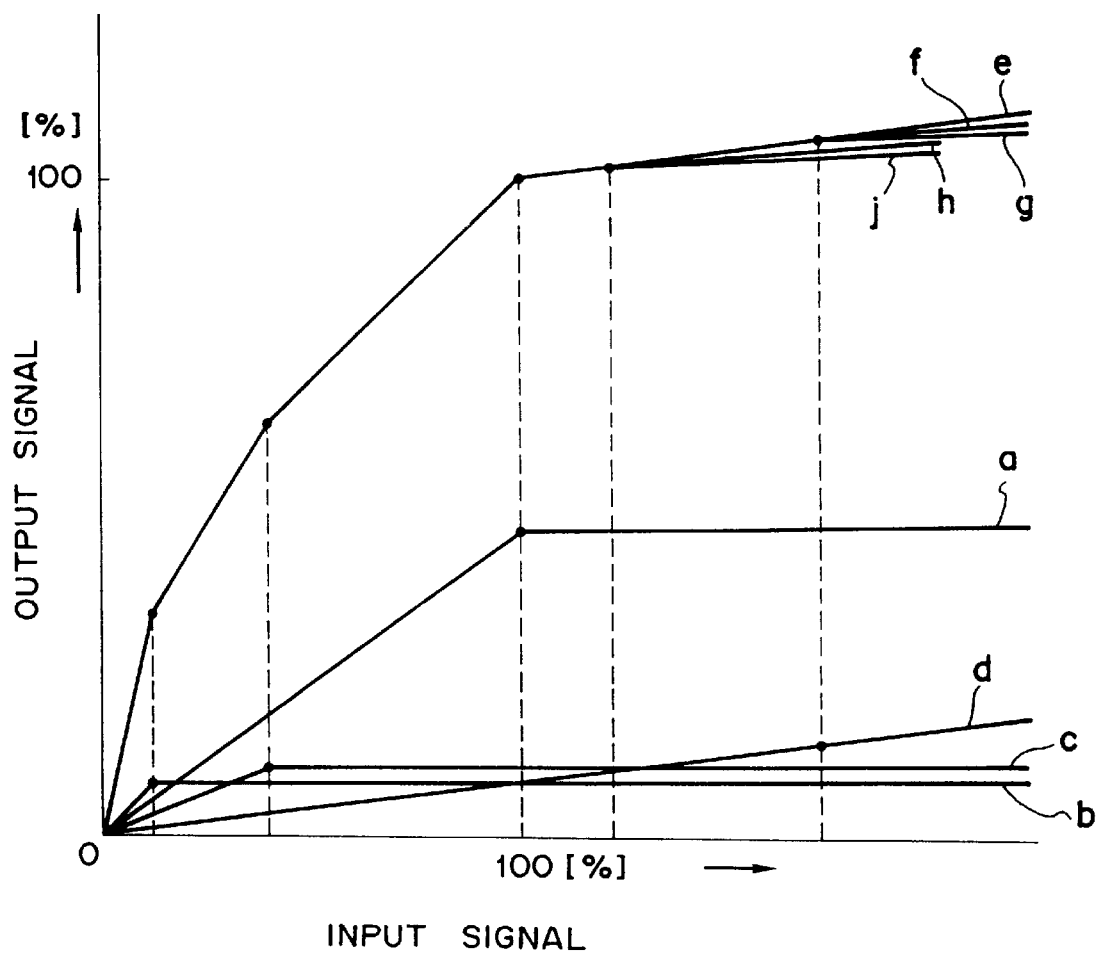
FIG. 11 is a diagram showing input/output characteristics of signals in the clip circuit shown in FIG. 10 in order to show clipping characteristics of the clip circuit shown in FIG. 10.

When the input signal shown in FIG. 4 is applied from the input terminal 1 to one of the clip circuits $13_1$ to $13_n$, clipping characteristics of the clip circuit are, for example, as shown by (a) in FIG. 11. Similarly, clipping characteristics of the other, for instance, two clip circuits are as shown, for example, by (b) and (c) in FIG. 11. In this instance, an inclination of each of the clipping characteristics (a, b, c) is set to a gain $|-R_f/R_i|$ (i=1,2, ..., n) of the addition amplifier 21.

In the knee circuit 14, when both of the two transistors 19 and 20 are turned off, input/output characteristics of the knee circuit 14 are set to a ratio $|-R_f/(R_A+R_B)|$ of the maximum addition resistance $(R_A+R_B)$ and the feedback resistance $R_f$ and become as shown by characteristics (d) in FIG. 11. Therefore, input/output characteristics of the whole gamma correction circuit are as shown by (e) in which the above characteristics (a, b, c, d) are added.

In this state, when only the transistor 19 is turned on and the resistor $R_{11}$ is connected, so long as the absolute value of the input signal is larger than $V_1-V_{BE1}$ ($V_{BE1}$: voltage between the base and emitter of the transistor 19), the inclination of the input/output characteristics is set to $|-R_f/(R_A+R_B)\times R_{11}/(R_A+R_{11})|$. In this instance, characteristics (f) shown in FIG. 11 are obtained.

Similarly, when only the transistor 20 is turned on and the resistor $R_{12}$ is connected, so long as the absolute value of the input signal is larger than $|V_2-V_{BE2}|$, the inclination is set to characteristics (g).

In this case, it is necessary to set the values $|V_i-V_{BEi}|$ to the same voltage. This voltage assumes a knee characteristics switching voltage (knee point). By changing the values of $V_1$ and $V_2$, the knee point can be changed as shown by characteristics (h, j).

According to the gamma correction circuit of the embodiment, since a gain (knee slope) and a knee point of the high luminance portion are independently changed, in case of the image signal in which both of the high luminance portion and the low luminance portion mixedly exist, the improvement of the whole blank state can be controlled by using the CPU 23.

In the clip circuits $13_1$ to $13_n$ using the differential amplifier by the emitter follower, when the transistor 8 is turned off, the transistor 9 is turned on and the emitter resistance is small. Therefore, a field through by the capacitance between the base and emitter of the transistor 8 is so small that it can be ignored. Thus, good high frequency characteristics are obtained. Changes in frequency characteristics due to the AC and DC levels of the input signal can be reduced.

When the characteristics of the transistors 8 and 9 are matched, since the precisions of the polygonal points of the input/output characteristics are high, the luminance of the gamma correction can be set to be relatively high.

Figure 6:
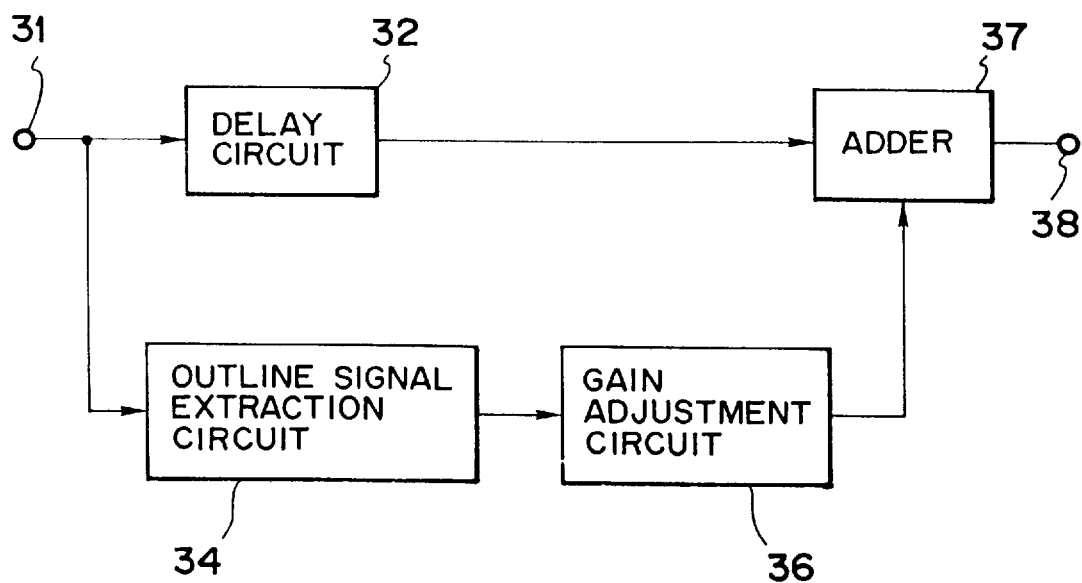
FIG. 6 is a diagram showing a construction of a conventional outline correcting apparatus.
Figure 7A:
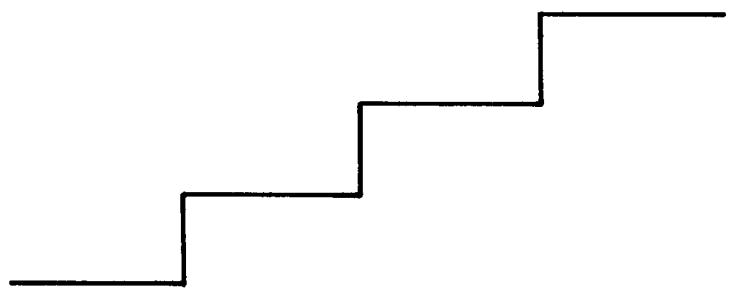
FIGS. 7A to 7C are diagrams showing signal waveforms in respective sections of the outline correcting apparatus shown in FIG. 6 in order to explain the operation of the conventional outline correcting apparatus shown in FIG. 6.
Figure 7B:
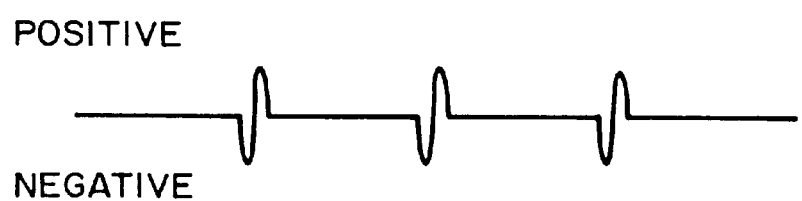
Figure 7C:
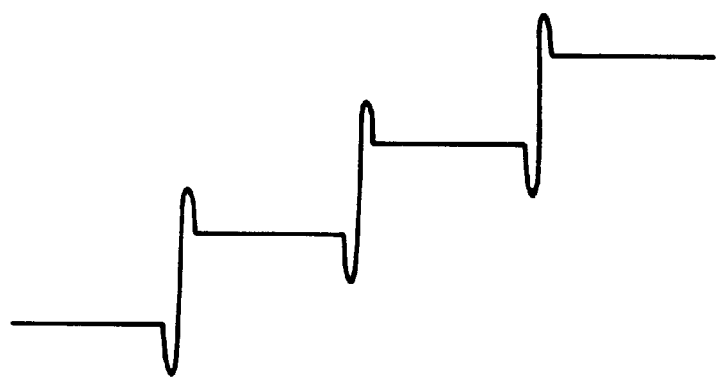
Figure 8:
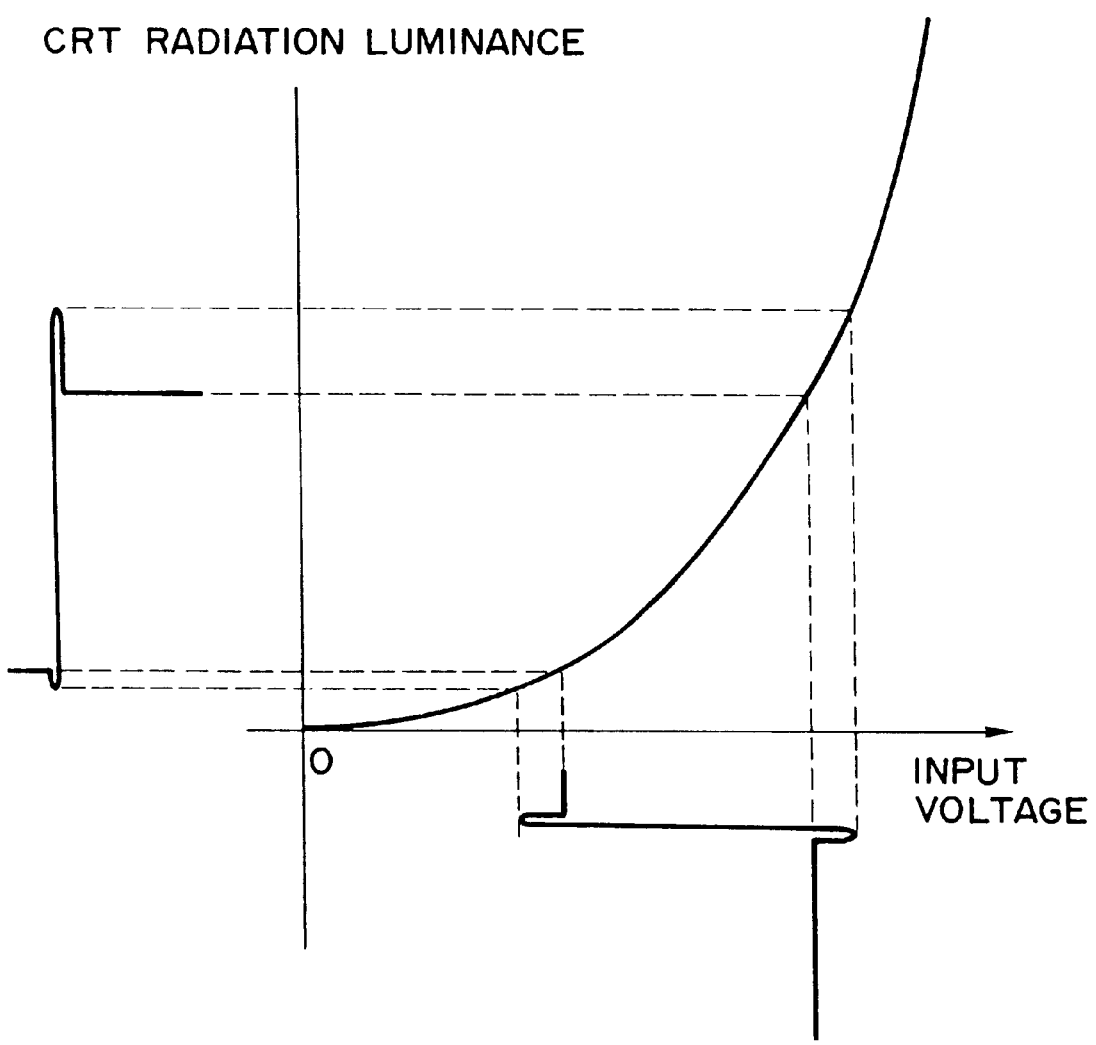
FIG. 8 is a diagram showing a signal waveform which is processed in a CRT in order to explain the operation of the conventional outline correcting apparatus shown in FIG. 6.
Figure 12:
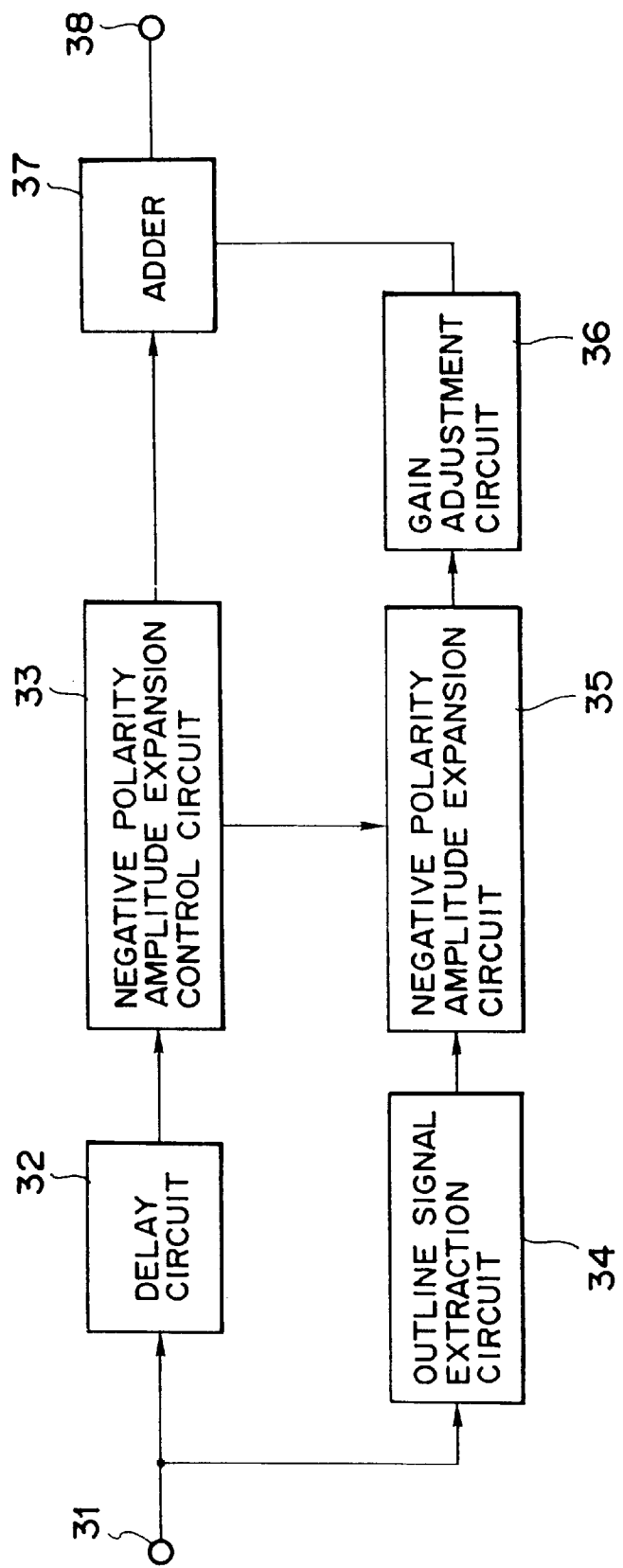
FIG. 12 is a diagram showing a construction of an outline correcting apparatus as a second embodiment of the invention.

FIG. 12 is a block diagram showing a construction of an outline correcting apparatus as a second embodiment of the invention. In FIG. 12, the portions corresponding to those shown in FIG. 6 are designated by the same reference numerals and their descriptions are omitted.

In the outline correcting apparatus shown in FIG. 12, reference numeral 33 denotes a negative polarity amplitude expansion control circuit for controlling a degree of amplitude expansion on the negative polarity side of the outline signal in accordance with the level of the input video signal. Reference numeral 35 denotes a negative polarity amplitude expansion circuit for expanding the amplitude on the negative polarity side of the outline signal under control of the negative polarity amplitude expansion control circuit 33 and applies the resultant signal to the gain adjustment circuit 36.

The operation of the outline correcting apparatus shown in FIG. 12 will now be described.

Figure 13A:
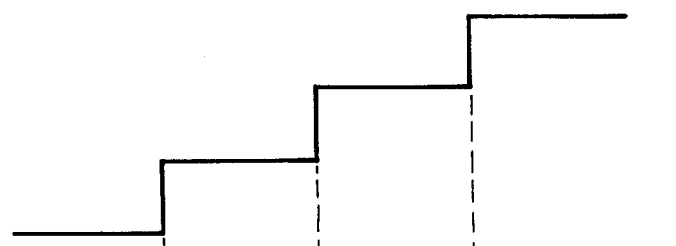
FIGS. 13A to 13D are diagrams showing signal waveforms in respective sections of the outline correcting apparatus shown in FIG. 12 in order to explain the operation of the outline correcting apparatus shown in FIG. 12.
Figure 13B:
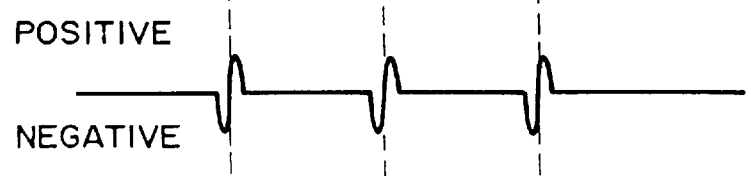
Figure 13C:
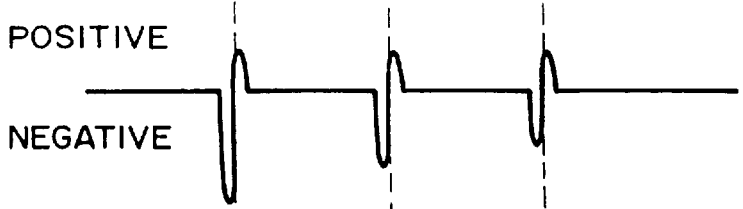
Figure 14:
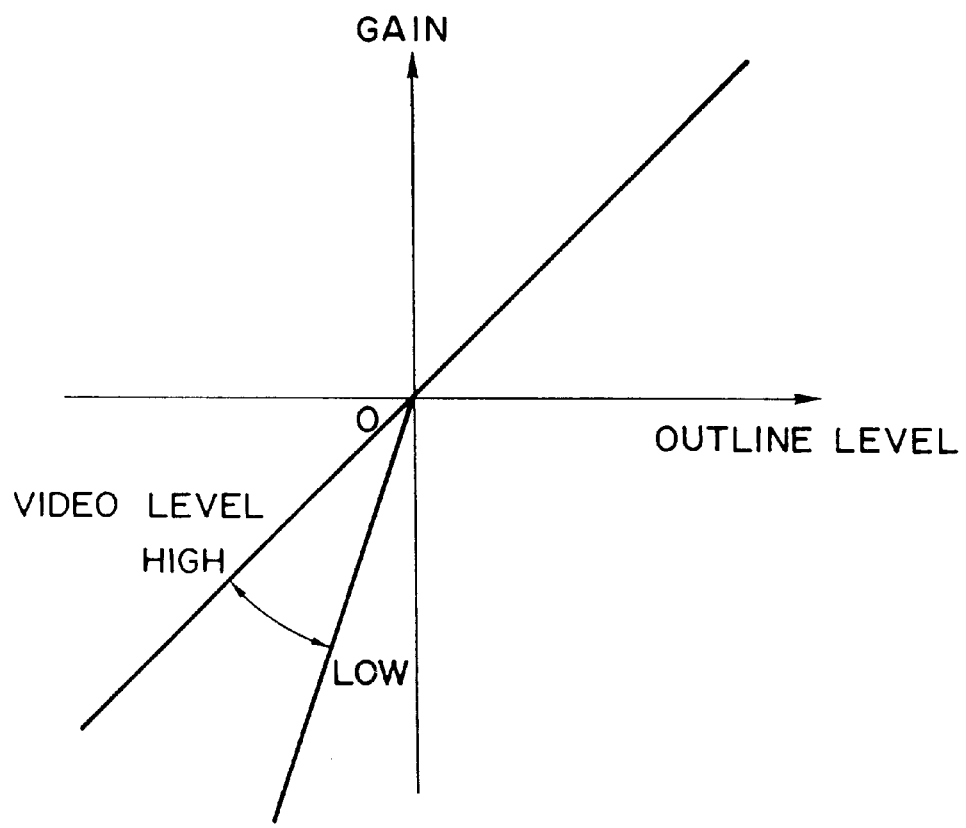
FIG. 14 is a diagram showing a method of expanding an amplitude of an outline signal in the outline correcting apparatus shown in FIG. 12 in order to explain the operation of the outline correcting apparatus shown in FIG. 12.

When a signal as shown in FIG. 13A is input to the input terminal 31, an outline signal as shown in FIG. 13B is extracted in a manner similar to the conventional case by the outline signal extraction circuit 34. After that, the amplitude on the negative polarity side of the outline signal is expanded by the negative polarity amplitude expansion control circuit 33 and the negative polarity amplitude expansion circuit 35 in accordance with the level of the video signal by a method shown in FIG. 14. Thus, an outline signal as shown in FIG. 13C is derived.

Figure 13D:
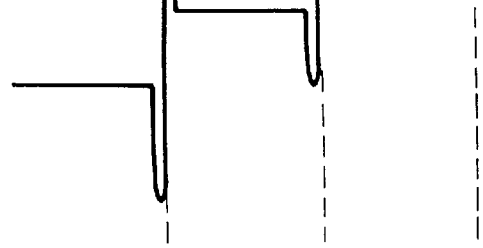

After the outline correction amount was adjusted by the gain adjustment circuit 36, the outline signal is added to the video signal by the adder 37 and the resultant signal is output from the output terminal 38. The addition output has a waveform such that the undershoot portion decreases with an increase in level in the video signal as shown in FIG. 13D. When the video signal having the above waveform is supplied to the CRT having the light emitting characteristics shown in FIG. 1, the undershoot portion is compressed in accordance with the light emitting characteristics, so that an image in which the overshoot portion and undershoot portion of the outline are well balanced is obtained.

Figure 15:
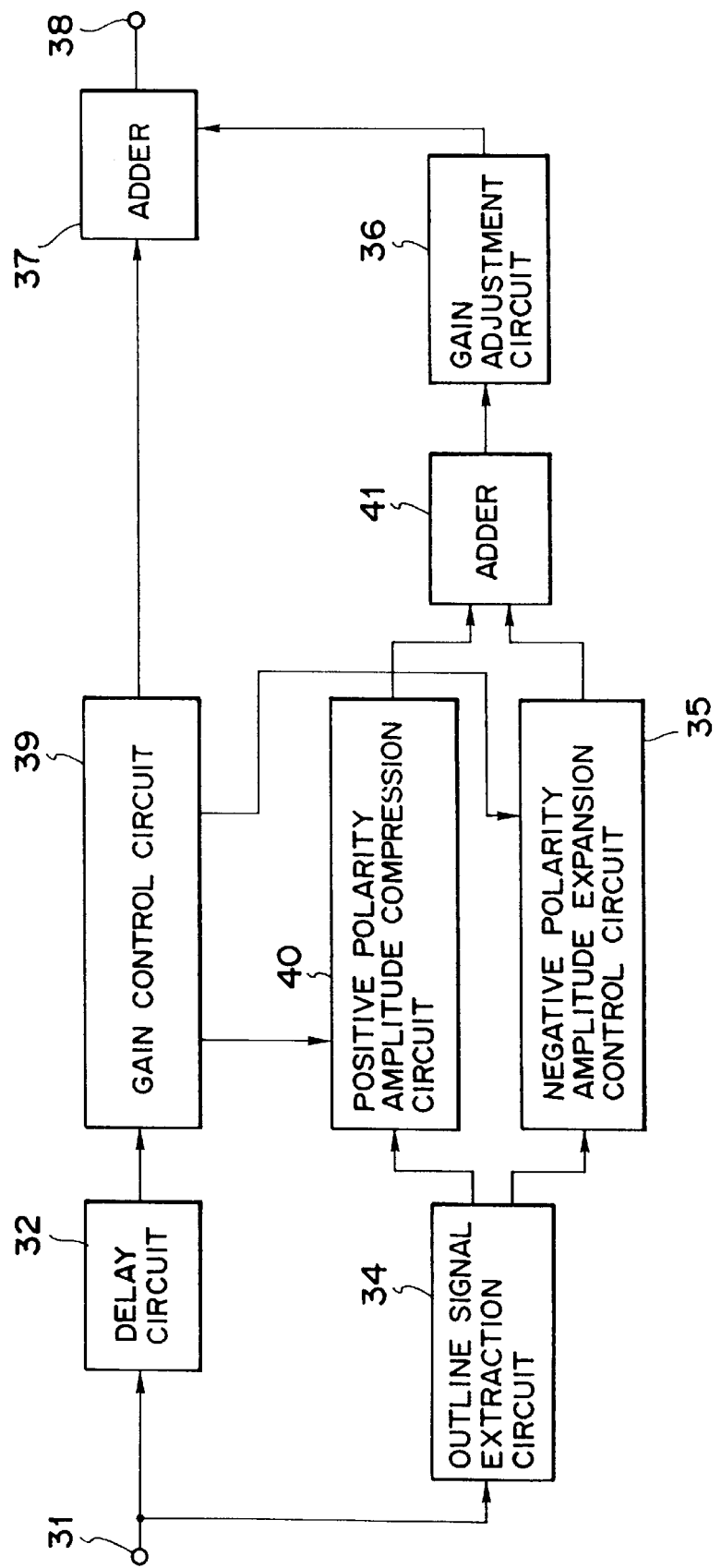
FIG. 15 is a diagram showing another construction example of an outline correcting apparatus as a second embodiment of the invention shown in FIG. 12.

Although the embodiment has been described with respect to only the case of expanding the amplitude on the negative polarity side of the outline signal in accordance with the video level, the amplitude gains on the positive and negative polarity sides of the outline signal can be independently varied in accordance with the level of the video signal. FIG. 15 shows an embodiment in such a case.

In FIG. 15, reference numerals 31, 32, and 34 to 38 denote the same portions as those shown in the apparatus of FIG. 12. A gain control circuit 39 controls both of the gains on the negative and positive polarity sides of the outline signal in accordance with the level of the video signal. A positive polarity amplitude compression circuit 40 which is controlled by the gain control circuit 39 compresses the amplitude on the positive polarity side of the outline signal.

Outputs of the expansion circuit 35 and compression circuit 40 are added by an adder 41. After that, the addition signal is added to the video signal by the adder 37 through the gain adjustment circuit 36 and the resultant signal is output.

Figure 16A:
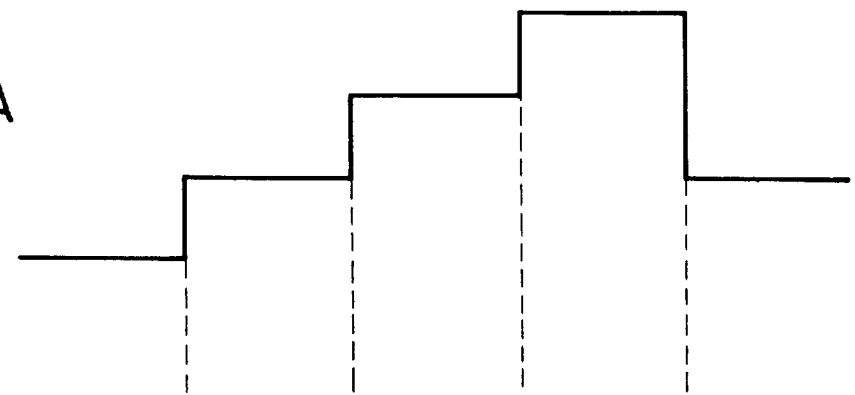
FIGS. 16A to 16D are diagrams showing signal waveforms in respective sections of the outline correcting apparatus shown in FIG. 15 in order to explain the operation of the outline correcting apparatus shown in FIG. 15.
Figure 16B:
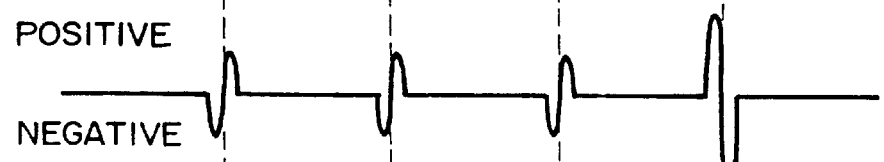
Figure 16C:

When a video signal shown in, for example, FIG. 16A is input to the input terminal 31, an outline signal shown in FIG. 16B is extracted by the outline signal extraction circuit 34. The expansion circuit 35 and compression circuit 40 respectively independently expands or compresses the amplitude of the outline signal in accordance with the level of the video signal. The output signals of those circuits are added by the adder 41, so that an outline signal as shown in FIG. 16C is derived.

Figure 16D:

After that, the outline correction amount is adjusted by the gain adjustment circuit 36 and the result is subsequently added to the video signal by the adder 37, so that the addition output has a waveform as shown in FIG. 16D. When the video signal of such a waveform is supplied to the CRT having light emitting characteristics as shown in FIG. 1, an image in which the overshoot portion and undershoot portion of the outline are well balanced is derived.

As mentioned above, according to the gamma correction circuit as a first embodiment of the invention, outputs of a plurality of clip circuits which can control the clipping characteristics and an output of the knee circuit are added and a resistance of each clip circuit and a resistance of the knee circuit can be controlled by using the CPU or the like, so that the following effects are obtained.

(1) Since the gain (knee slope) of the high luminance portion and the voltage (knee point) to switch the gain of the high luminance portion can be independently changed, a whole blank state in, case of an image signal in which the high and low luminance portions mixedly exit can be improved.

(2) Since the input/output characteristics can be changed by using the CPU or the like, the input/output characteristics can be automatically adjusted or remote controlled.

(3) By constructing the clip circuit: by the differential amplifier using the emitter follower, the apparatus has good high frequency characteristics, the changes in frequency characteristics by the AC and DC levels of the input signal can be reduced, and the precision of the input/output characteristics can be set to be relatively high.

According to the outline correcting apparatus as a second embodiment of the invention, the amplitude of at least one of the positive and negative polarity sides of the outline signal is controlled in accordance with the level of the video signal. Therefore, even in the case where the outline corrected video signal was output to the CRT after completion of the gamma correction, an image of a high quality in which the outline portion is well balanced can be obtained by a simple circuit construction.

The third embodiment of the invention will now be described hereinbelow.

Figure 17:
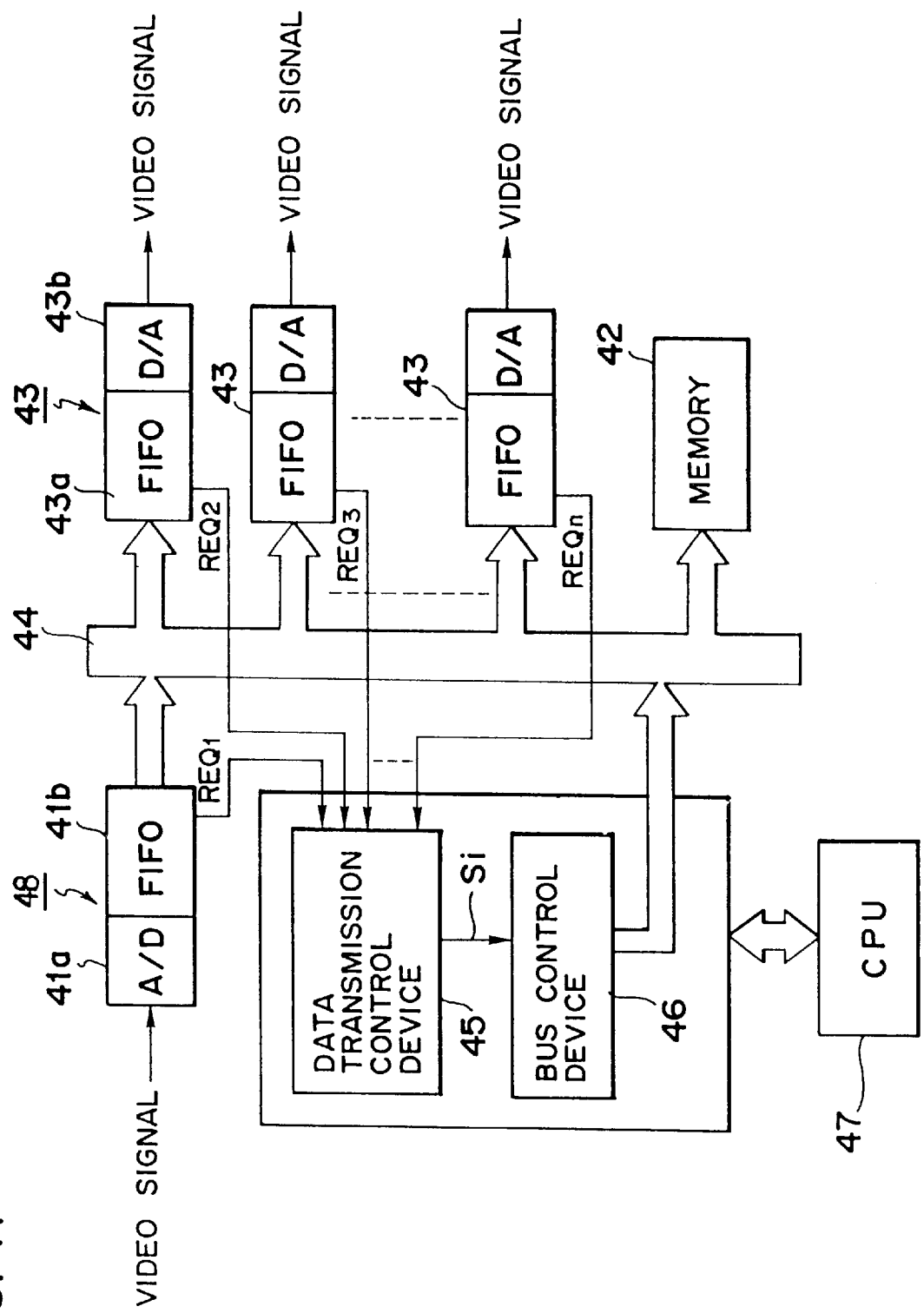
FIG. 17 is a diagram showing a construction example of a data transmission system as a third embodiment of the invention.

FIG. 17 shows a construction example of a data transmission system to which the invention is applied as a third embodiment of the invention. It is now assumed that the video signal is handled.

In FIG. 17, reference numeral 41 denotes an input port 48. The input analog video signal is converted into the digital data by an A/D converter 41a and stored into an FIFO (First-in First-out) memory 41b. Reference numeral 42 denotes a memory into which the digital data accumulated in the input port 48 is transmitted and stored; and 43 indicates a plurality of output ports. The data in the memory 42 is selectively transmitted and stored into an FIFO memory 43a. The digital data in the FIFO memory 43a is converted into the analog video signal by a D/A converter 43b and output. Reference numeral 44 denotes a bus to transmit the data. The bus 44 includes an address bus. The input port 48 and output port 43 generate transmission request signals $REQ_1$ to $REQ_n$ in accordance with states of the FIFO memories 41b and 43a, respectively.

Reference numeral 45 denotes a data transmission control apparatus according to the invention. One of the input port 48 and the output port 43 is selected in accordance with the transmission request signals $REQ_1$ to $REQ_n$ on the basis of the order of priority, which will be explained hereinlater, and the selction signal $S_i$ (i=1 to n) is output. At the same time, by exchanging the order of priority, the transmitting operations of the input and output ports 48 and 43 are controlled so as to be averagely executed at the same probability.

Reference numeral 46 denotes a bus control apparatus for controlling the bus 44 and selecting one of the input and output ports 48 and 43 in accordance with the selection signal $S_i$ which is output from a data transmission control device 45. Reference numeral 47 denotes a CPU for executing the control of the data transmission control device 45 and bus control apparatus 46, the control of the whole system, and arithmetic operating processes.

Figure 18:
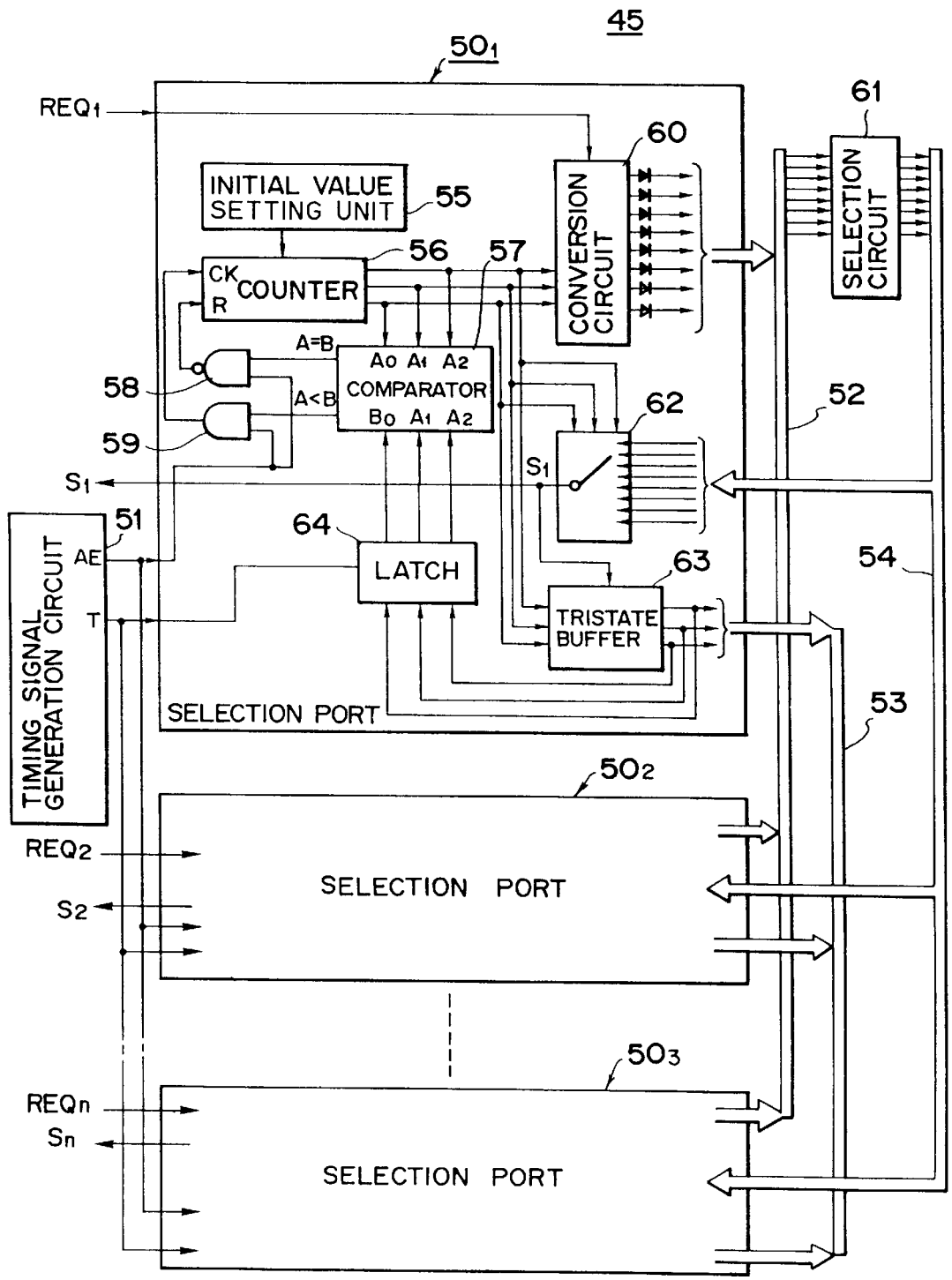
FIG. 18 is a diagram showing a constriction example of a data transmission control apparatus in the data transmission system shown in FIG. 17.

FIG. 18 shows a construction example of the data transmission control device 45 in the data transmission system shown in FIG. 17.

In FIG. 18, reference numerals $50_1$ to $50_n$ denote (n) selection ports to which the transmission request signals $REQ_1$ to $REQ_n$ are input. Selection signals $S_1$ to $S_n$ are output from the selction ports $50_1$ to $50_n$. Reference numeral 51 denotes a timing signal generation circuit for generating timing signals T and AE which are necessary for the operations of the selection ports $50_1$ to $50_n$, respectively. Reference numerals 52, 53, and 54 indicate buses for communicating predetermined signals among the selection port, $50_1$ to $50_n$.

A construction of each of the selection ports $50_1$ to $50_n$ will now be described. There is shown the case where n =8, namely, in FIG. 17, one input port 48 and seven output ports 43 are provided and eight selection ports $50_1$ to $50_n$ are provided. The selection ports $50_1$ to $50_n$ have the same construction and the selection port $50_1$ will now be described here.

In FIG. 18, reference numeral 55 denotes an initial value setting unit for initial setting the order of priority of the selection port $50_1$; 56 a counter of 3 bits for changing the order of priority each time the transmitting operation is executed after the initial value of the priority order was set; 57 a comparator for comparing the priority order which is indicated by the count value of the counter 56 and has been set at present and the port numbers 1 to n which were selected at the preceding time, thereby deciding the next value of the counter 56; 58 an NAND gate for resetting the counter 56 when the comparison result of the comparator 57 indicates that A=B; and 59 an AND gate to increase the count value of the counter 56 when the comparison result indicates that A>B. The NAND gate 58 and AND gate 59 are operated by the timing signal AE. Reference numeral 60 denotes a conversion circuit for converting the value of 3 bits indicative of the priority order from the counter 56 into the output of 8 lines in response to the transmission request signal $REQ_1$ and for outputting to the bus 52 through a diode. The conversion circuit 60 comprises a 3–8 line decoder.

Reference numeral 61 denotes a selection circuit for selecting the port number of the highest priority order which is output from the conversion circuit 60 of each of the selection ports $50_1$ to $50_n$ to the bus 52 and for giving to the bus 54. The selection circuit 61 comprises a priority encoder and a decoder.

Reference numeral 62 denotes a selector in which the port number of the highest priority order which was given to the bus 54 is input to the corresponding line of the 8-line input. The selector 62 selects the line according to the value of the counter 56 and outputs the selection signal $S_1$ when the selected line coincides with the port number of the highest priority order. Reference numeral 63 denotes a tristate buffer for fetching the value of the counter 56 by the selection signal $S_1$ and outputting as a port number which was selected at the preceding time to the bus 53; 64 a latch circuit for latching the port number which was selected at the preceding time by the timing signal T and for giving to the comparator 57.

The operation by the above construction will now be described. In the data transmission control apparatus shown in FIG. 18, the initial value of the order of priority is input to each counter 56 of each of the selection ports $50_1$ to $50_n$ by the initial value setting unit 55 when the power source is turned on or after it was reset and is set into a mode to wait for the transmission request signals $REQ_1$ to $REQ_n$ from the input and output ports 48 and 43. When a plurality of transmission request signals are input, the conversion circuit 60 operates and outputs the number output corresponding to the priority order held in the counter 56 through the corresponding diode. The number output is input to the selection circuit 61 through the bus 52. The selection circuit 61 selects the number output of the highest priority order from the outputs of the conversion circuits 60 and applies the selected number to each selector 62 through the bus 54. The selector 62 has been switched to the line corresponding to the priority order set in the counter 56 of each of the selection ports $50_1$ to $50_n$. Therefore, the selection signal $S_i$ is output from the selector 62 of the selection port in which the number which had been output to the bus 54 was selected. Due to this, the bus control device 46 in FIG. 17 controls the bus 44 and the data is transmitted between the port of selected one of the input and output ports 48 and 43 and the memory 42.

The value of the counter 56 corresponding to the selected selection port is supplied to the bus 53 through the tristate buffer 63 in this instance and is held into the latch circuit 64. The comparator 57 compares the output B of the latch circuit 64 and the output A of the counter 56. The priority order upon operation at the next time is set into the counter 56 in accordance with the result of the comparison.

That is, when the comparison result indicates A=B, the counter 56 is reset through the NAND gate 58 and the priority order upon operation at the next time is set to the lowest order. When A>B, the count value of the counter 56 is increased through the AND gate 59, thereby increasing the priority order by one. When A<B, the value of the counter 56 is held as it is. The priority order upon operation at the next time is set by the above operation.

Each time the data is transmitted by the above operation, the next priority order is set. The input and output ports 48 and 43 can be uniformly selected in response to each of the transmission request signals $REQ_1$ to $REQ_n$.

Figure 19:
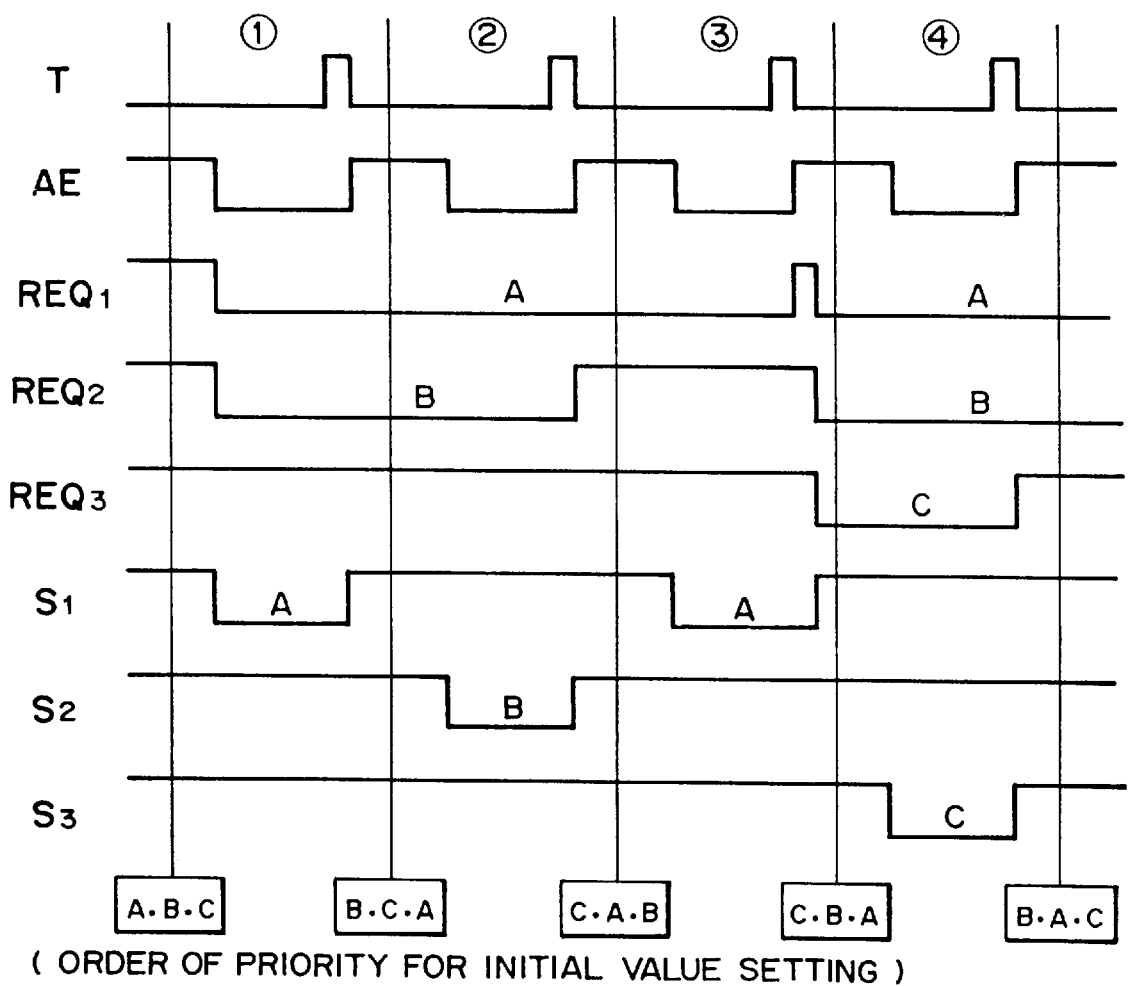
FIG. 19 is a timing chart showing signal waveforms in respective sections of the data transmission system shown in FIG. 17 in order to explain the operation of the data transmission system shown in FIG. 17.

FIG. 19 is a timing chart of each signal indicative of the operation in the case where three input and output ports 48 and 43 are used and set to ports A, B, and C, respectively.

In the example, the signal $REQ_1$ is continuously generated from the port A at the ①st to ④th times, the signal $REQ_2$ is generated from the port B at the ①st and ②nd and ④th times, and the signal $REQ_3$ is generated from the port C at the ④th time. Upon initial setting, the priority order is set in accordance with the order of the ports A, B, and C. Each time the data transmission is executed like ① to ④, the highest priority order is reduced to the lowest order at the next time. Thus, the selection signal $S_1$ to select the port A at the ①st time is obtained and the selection signal $S_2$ to select the port B at the second time is obtained. Since the transmission request signal is set to only $REQ_1$ at the third time, the selection signal $S_1$ is obtained. The selection signal $S_3$ to select the port C is obtained at the fourth time.

FIG. 20 is a diagram for explaining the relations among the selection result of the port, the change in priority order, and the transmission request in case of using five ports A, B, C, D, and E as input and output ports 48 and 43.

In FIG. 20, when it is now assumed that the signal REQ was input from the ports A, B, C, D, and E at the ①st time in response to the initial values A, B, C, D, and E of the priority order, the data transmission of the port A is executed,because the priority order of A is set to the high order. In this case, the next priority order is set to B, D, E, A, and C.

Figure 21:
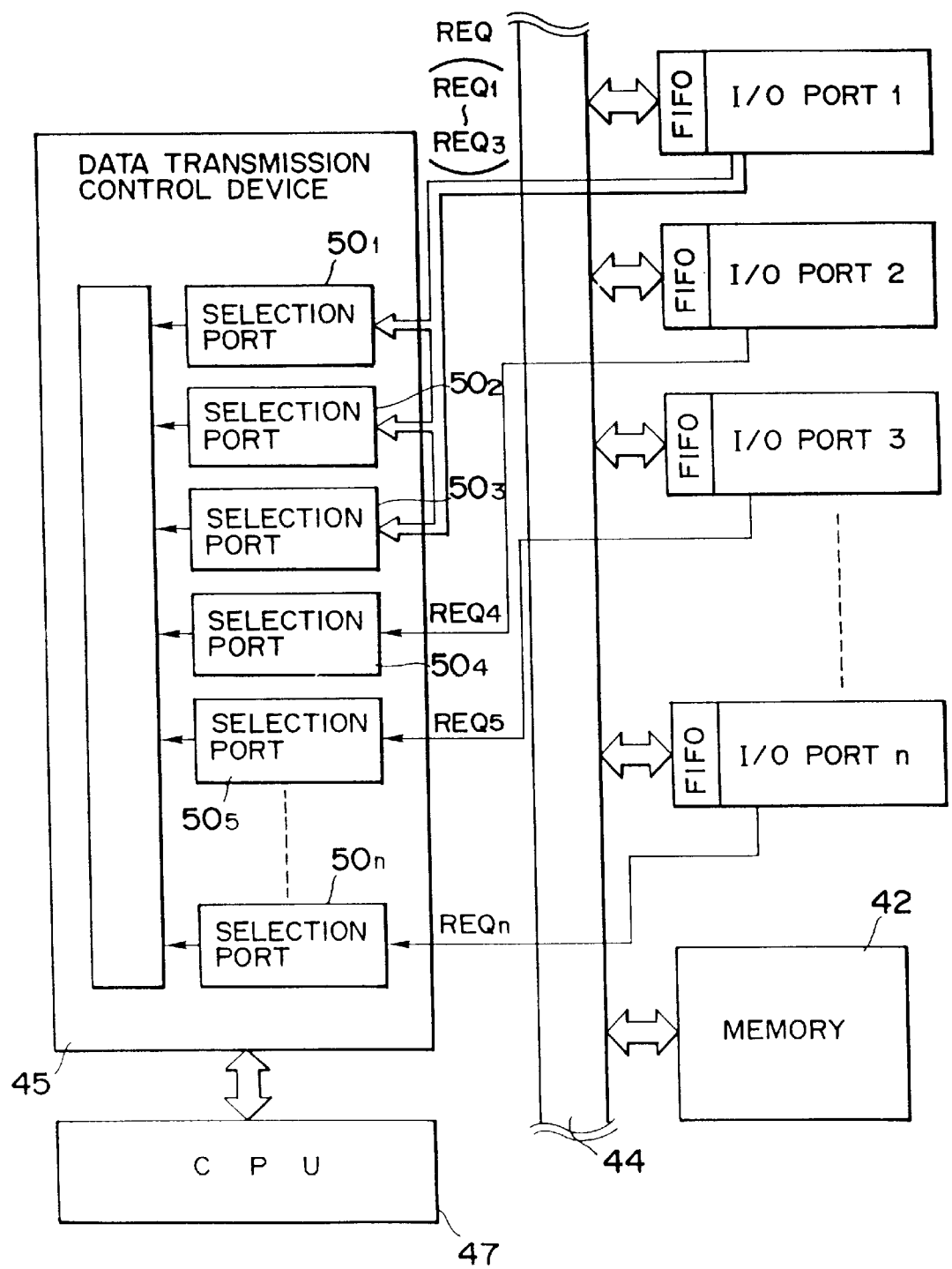
FIG. 21 is a diagram showing another construction example of a data transmission system as a third embodiment of the invention shown in FIG. 17.

In the case where the operator wants to, particularly, raise the ratio which is selected for the special input and output ports, a plurality of transmission request signals are connected in parallel and are used as shown in FIG. 21. In FIG.

21, the transmission request signals REQ from the input and output ports 48 and 43 are set to $REQ_1$ to $REQ_3$ and are connected in parallel to the selection ports $50_1$ to $50_3$ of the data transmission control device 45, thereby raising the probability such that the port 1 is selected to be higher than the priorities of the other ports.

As described above, in the data transmission system of the embodiment, since the priority order at the next time is determined on the basis of the result of the transmission, so that the data of each of the input and output ports can be transmitted at a uniform probability. Therefore, the data bus can be efficiently used and a transmission data amount per unit time can be increased. There is also an effect such that the capacity of the FIFO memory which is necessary for each input and output can be reduced or the like.

What is claimed is:

1. An information signal correction processing apparatus for processing an input information signal, comprising:

(A) a plurality of clip circuits to which said input information signal is commonly input and each of which clips said input information signal in accordance with clipping characteristics which are arbitrarily set;

(B) a knee circuit for voltage dividing said input information signal in accordance with a voltage dividing ratio which is arbitrarily set;

(C) an adding circuit for adding outputs from said plurality of clip circuits and an output from said knee circuit; and (D) control means for controlling the clipping characteristics in each of said plurality of clip circuits and for controlling the voltage dividing ratio in said knee circuit.

2. An apparatus according to claim 1, wherein said input information signal includes a video signal.

3. An apparatus according to claim 2, wherein said information signal processing apparatus is a gamma characteristics correcting apparatus for correcting gamma characteristics of the video signal.

4. An apparatus according to claim 1, wherein said control means includes:

(a) control data holding means for holding a plurality of kinds of clipping characteristics control data each for controlling the clipping characteristics of said plurality of clipping circuits and plurality of kinds of voltage dividing ratio control data each for controlling the voltage dividing ratio in said knee circuit; and (b) control signal generating means for generating a clipping characteristics control signal according to one of said plurality of kinds of clipping characteristics control data held in said control data holding means to supply said clipping characteristics control signal to said plurality of clip circuits and for generating a voltage dividing ratio control signal according to one of said plurality of kinds of voltage dividing ratio control data held in said control data holding means to supply said voltage dividing ratio control signal to said knee circuit.

5. An information signal processing apparatus for processing an input information signal, comprising:

(A) information signal extracting means for inputting said input information signal and extracting a part of said input information signal;

(B) first level adjustment means for adjusting a level of positive polarity side of the signal output from said information signal extracting means, to output a first signal;

(C) second level adjustment means for adjusting a level of negative polarity side of the signal output from said information signal extracting means, to output a second signal;

(D) control means for inputting said input information signal and controlling level adjustment operations of said first level adjustment means and said second level adjustment means according to the level of said input information signal; and (E) adding means for adding the first signal which is output from said first level adjustment means and the second signal which is output from said second level adjustment means to the input information signal which is input to said information signal extracting means.

6. An apparatus according to claim 5, wherein said input information signal includes a video signal.

7. An apparatus according to claim 6, wherein said information signal correction processing apparatus is an outline portion correcting apparatus for correcting an outline portion of a video image corresponding to said video signal.

8. An apparatus according to claim 6, wherein said information signal extracting means is arranged so as to input the video signal and extract and output the video signal corresponding to an outline portion of a video image corresponding to said input video signal.

9. An information signal correction processing apparatus for processing an information signal, comprising:

(a) information signal processing means for processing the information signal;

(b) a plurality of input/output ports each for instructing an information signal transmission request to transmit the information signal to said information signal processing means or to receive the information signal from the information signal processing means and for inputting or outputting the information signal in accordance with the instructed transmission request;

(c) a common bus for transmitting the information signal between each of said plurality of input/output ports and said information signal processing means; and (d) information signal transmission control means for setting an order of priority for use of the input/output port when the information signal is transmitted on said common bus, in accordance with the information signal transmission request that is instructed from said plurality of input/output ports and changing said priority order for use of the input/output port each time the information signal is transmitted from or received at one of said plurality of input/output ports, thereby controlling the transmission of said information signal.

10. An apparatus according to claim 9, wherein said information signal processing means includes a memory for storing the information signal or for reading out the stored information signal.

11. An apparatus according to claim 9, wherein said information signal includes video data.

* * * * *

UNITED STATES PATENT AND TRADEMARK OFFICE
CERTIFICATE OF CORRECTION

PATENT NO. : 5,903,316
DATED : May 11, 1999
INVENTOR(S) : Yuichiro Hattori

It is certified that error appears in the above-identified patent and that said Letters Patent is hereby corrected as shown below:

Column 1, line 17, delete "voltage, L," and insert therefor -- voltage, L --.
Column 1, line 57, delete "resistors:5: and insert therefor -- resistors 5 --.
Column 2, line 53, delete "b)y" and insert therefor -- by --.
Column 4, line 50, delete "constriction" and insert therefor -- construction --.
Column 5, line 13, delete "constriction" and insert therefor -- construction --.
Column 8, line 6, delete "in, case" and insert therefor -- in case --.
Column 8, line 12, delete "circuit:by" and insert therefor -- circuit by --.
Column 9, line 10, delete "port, $50_1$," and insert therefor -- "ports $50_1$ --.

IN THE CLAIMS

Column 11, Claim 5, line 1, delete "signal processing" and insert therefor -- signal correction processing --.

Signed and Sealed this

Ninth Day of May, 2000

*Attest:*

Q. TODD DICKINSON

*Attesting Officer*     *Director of Patents and Trademarks*